United States Patent [19]

Konno et al.

[11] Patent Number: 5,141,991

[45] Date of Patent: Aug. 25, 1992

[54] PROCESS FOR PREPARING FLUORORUBBER GRAFT COPOLYMER

[75] Inventors: Hiroki Konno, Kawasaki; Yasushi Yamamoto, Takasaki; Shigehisa Sonegawa, Annaka, all of Japan

[73] Assignee: Shin-Etsu Chemical Co., Ltd., Tokyo, Japan

[21] Appl. No.: 533,830

[22] Filed: Jun. 6, 1990

[30] Foreign Application Priority Data

Jun. 7, 1989 [JP] Japan .................................. 1-144476

[51] Int. Cl.$^5$ .............................................. C08L 27/12
[52] U.S. Cl. .................................... 525/102; 525/104; 525/288
[58] Field of Search ....................... 525/102, 104, 288

[56] References Cited

U.S. PATENT DOCUMENTS

| 3,415,900 | 12/1968 | Robb et al. | 525/104 |
| 4,314,043 | 2/1982 | Kojima | 525/102 |

FOREIGN PATENT DOCUMENTS

| 731223 | 3/1966 | Canada | 525/102 |
| 783311 | 12/1980 | U.S.S.R. | 525/102 |

*Primary Examiner*—John C. Bleutge
*Assistant Examiner*—R. Dean, Jr.
*Attorney, Agent, or Firm*—Oblon, Spivak, McClelland, Maier & Neustadt

[57] ABSTRACT

A process for preparing a fluororubber graft copolymer, comprising the step of graft-copolymerizing, onto (A) a fluororubber, (B) at least one organosilicon compound having the general formula (I):

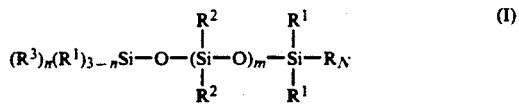

wherein $R^3$ represents a monovalent unsaturated aliphatic hydrocarbon group; and $R^N$ represents as nitrogen-containing organic group having the general formula (II):

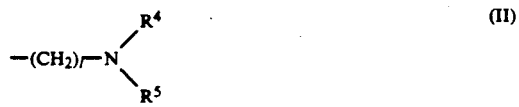

or the general formula (III):

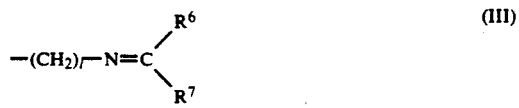

where $R^4$ and $R^5$ each represent a hydrogen atom or a $C_1$-$C_{15}$ organic group, and $l$ is an integer of from 0 to 6, $R^6$ and $R^7$ have the same meaning as $R^3$ and $R^4$ or may form together a divalent hydrocarbon group represented by the formula:

$-(CH_2)_k-$ where $k$ represents an integer of 4 to 9, n represents an integer of 1 to 3, and m is an integer of from 0 to 10. The fluororubber graft copolymer has good workability in roll milling, and is vulcanizable under normal pressure. The cured products have good mechanical strength and low temperature properties.

3 Claims, No Drawings

PROCESS FOR PREPARING FLUORORUBBER GRAFT COPOLYMER

BACKGROUND OF THE INVENTION

1. Field of the Invention

The present invention relates to a process for preparing a fluororubber graft copolymer.

2. Description of the Prior Art

Fluororubbers are recently noted as a material having good oil resistance, solvent resistance and heat resistance.

The fluororubbers, however, have the drawbacks that they have poor workability in kneading processes such as roll milling, and that, when cured molded products such as tubing are produced, treatment with pressurized water steam or long time heat-treatment was required for vulcanization after a molding step. The cured products obtained have also drawbacks that they have too high rigidity or poor elongation in spite of good tensile strength, or exhibit poor low temperature properties according to the Gehman torsion test or the T-R test.

SUMMARY OF THE INVENTION

Accordingly, it is an object of the present invention to provide a process for preparing a fluororubber graft copolymer that has not only good oil resistance, solvent resistance and heat resistance but also has good workability in roll milling, and is vulcanizable under normal pressure and capable of producing cured products having good mechanical strength and good low temperature properties. Thus, the present invention provides a process for preparing a fluororubber graft copolymer, comprising the step of graft-copolymerizing, onto (A) a polyaminevulcanizable fluororubber, (B) at least one organosilicon compound having the general formula (I):

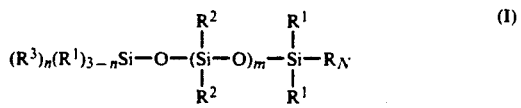

wherein plural $R^1$ and $R^2$ may be the same or different each represent a substituted or unsubstituted monovalent organic group; $R^3$ represents a monovalent unsaturated aliphatic hydrocarbon group; and $R_N$ presents a nitrogen-containing organic group having the genera formula (II):

where $R^4$ and $R^5$ may be the same or different and each represent a hydrogen atom or a substituted or unsubstituted $C_1$–$C_{15}$ organic group, and l is an integer of from 1 to 6, or the general formula (III):

where $R^6$ and $R^7$ have the same meaning as $R^4$ and $R^5$ as defined above or may form together a divalent hydrocarbon group represented by the formula:

$$-(CH_2)_k-$$

where k represents an integer of from 4 to 9, and l is as defined above, n represents an integer of 1 to 3, and m is an integer of from 0 to 10.

According the present process, it is possible to obtain a fluorine graft copolymer that has not only good oil resistance, solvent resistance and heat resistance but also has good workability in roll milling, and is vulcanizable under normal pressure and capable of producing cured products having good mechanical strength and good low temperature properties. Further, compositions having good physical properties can be prepared by adding the copolymer obtained to silicone rubbers, for instance.

DETAILED DESCRIPTION OF PREFERRED EMBODIMENTS

(A) Polyamine-vulcanizable fluororubber

Polyamine-vulcanizable fluororubbers which may be used as (A) in the present invention include, for example, copolymers of at least one of vinylidene fluoride, ethylene tetrafluoride and propylene fluoride, and at least one other monomer copolymerizable with these, which are known to be vulcanizable with a polyamine. The other monomers copolymerizable with said vinylidene fluoride and so forth include, for example, ether-linkage containing olefins such as perfluoroalkyl perfluorovinyl ethers, alkyl fluorovinyl ethers, and ethyl vinyl ether, olefins such as ethylene, propylene and isobutylene, haloolefins such as trifluoroethylene and monochlorotrifluoroethylene, and fluoroalkyl-containing olefins such as perfluorobutylethylene, perfluorohexylethylene and perfluorooctylethylene. Examples of such fluororubbers include those commercially available under tradenames, VITON A-types, B-types and G-types supplied by du Pont, Fluorel FC-2260, FC-2145, FC-2230 and FLS-2690 supplied by 3M, DAI-EL G-201, G-501, G-801, G-901, G-912 and G-1001 supplied by Dakin Industries Co (Japan), Aflas 200 series, 150 series and 100 series supplied by Asahi Glass Co., Ltd.

Among the fluororubbers, preferred are fluororubbers comprising vinylidene fluoride.

(B) Orqanosilicon compound

In the general formula (I) representing the organosilicon compound of (B), plural $R^1$ and $R^2$ may be the same or different and each represent a substituted or unsubstituted monovalent $C_1$–$C_{16}$ organic group, including, for example, $C_1$–$C_5$ alkyl groups such as methyl and ethyl, $C_6$–$C_{10}$ aromatic hydrocarbon groups such as phenyl and tolyl, halogenated hydrocarbon groups such as 3,3,3trifluoropropyl, 2-(perfluorobutyl)ethyl, 2-(perfluorohexyl)ethyl and 2-(perfluorooctyl)ethyl, and $C_2$–$C_6$ alkenyl groups such as vinyl, and fluorine-containing groups represented by the formula:

$$Rf^1-(-)-Rf^2-)_n-R-$$

where $Rf^1$ represents a $C_1$–$C_5$ perfluoroalkyl groups, $Rf^2$ represents $C_2$–$C_5$ perfluoroalkylene group, R represents an alkylene group with 2 or more carbon atoms, and n is an integer of from 1 to 6, including the following typical examples:

$CF_3(OCF_2CF_2)_n-CH_2CH_2-$ where n is an integer of from 1 to 5, $CF_3CF_2(OCF_2CF_2)_n-CH_2CH_2$ from 1 to 5, and

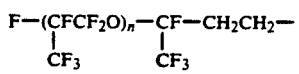

where n is an integer of from 1 to 4.

Among the above groups, the halogenated hydrocarbon groups are preferred, and the fluorinated hydrocarbon groups are more preferred inasmuch as compatibility of the organosilicon compound of (B) with the fluororubber of (A) is enhanced. The organosilicon compound in which a part of plural $R^2$ are the vinyl group is advantageous in that it is blended with a silicone rubber to give a composition that can be vulcanized by heating under normal pressure using a peroxide as a vulcanizing agent.

$R^3$ represents a monovalent unsaturated aliphatic hydrocarbon group, including, for example, $C_2-C_6$ alkenyl groups such as vinyl and allyl, preferably vinyl.

$R_N$ represents a nitrogen-containing organic group having the general formula (II):

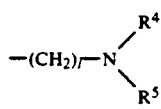

wherein $R^4$ and $R^5$ may be the same or different and each represent a hydrogen atom or a $C_1-C_{15}$ substituted or unsubstituted organic group, preferably a hydrogen atom or a $C_1-C_{10}$ substituted or unsubstituted organic group, including, for example, $C_1-C_{15}$ alkyl groups such as methyl, ethyl, butyl, n-pentyl, n-hexyl, and n-heptyl, corresponding substituted alkyl groups substituted by an amino group, $C_6-C_{15}$ aromatic hydrocarbon groups such as phenyl, p-methoxyphenyl, m-methoxyphenyl, o-methoxyphenyl, benzyl, 2-phenylvinyl, 1-naphthyl and 2-naphthyl; and l is an integer of from 1 to 6, preferably an integer of from 1 to 3, or a nitrogen-containing organic group having the general formula (III):

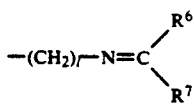

wherein $R^6$ and $R^7$ have the same meaning as $R^4$ and $R^5$ as defined above, or may form together a divalent hydrocarbon group represented by the formula:

where k represents an integer of from 4 to 9, preferably an integer of from 6 to 8, including, for example, tetramethylene, pentamethylene and heptamethylene, and l is the same as defined in respect of the general formula (II).

Among the groups of the general formula (II), preferred are those in which $R^4$ and $R^5$ may be the same or different and each represent a hydrogen atom or a $C_1-C_5$ alkyl group, and l represents an integer of from 1 to 3. Specifically, typical preferred examples include:

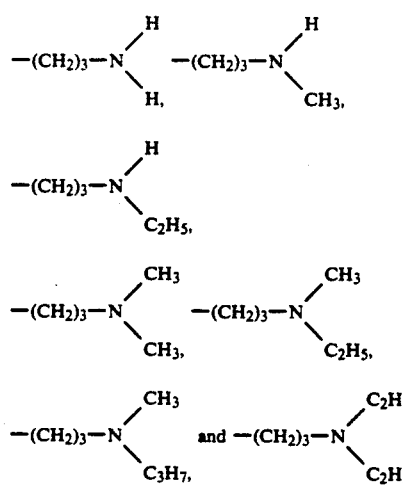

Among the groups of the general formula (III), preferred are those in which $R^6$ and $R^7$ represent a hydrogen atom, an $C_1-C_{10}$ alkyl group, phenyl, benzyl, 2-phenylvinyl or 2-phenylethyl, or form together a group of the formula:

where k represents an integer of from 6 to 8. Specifically, typicl preferred examples include:

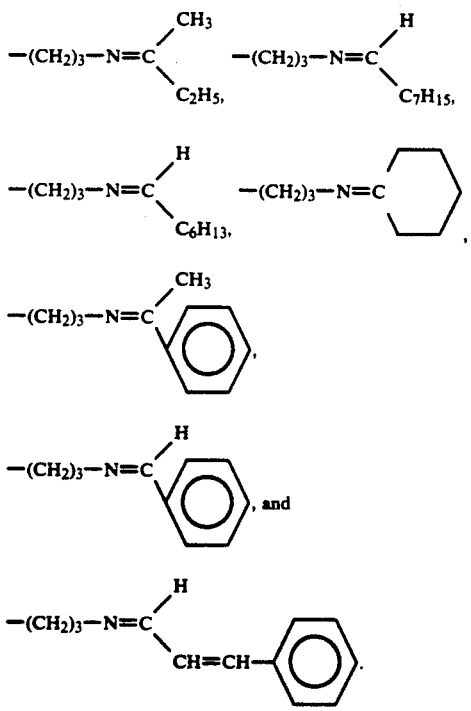

In the general formula (I), n is an integer of from 1 to 3, preferably an integer of 1 or 2, and m is an integer of from 0 to 10, preferably an integer of from 0 to 5 in view of easiness in the grafting reaction.

Preferred organosilicon compounds of (B) are exemplified by the compounds of the formulas below.

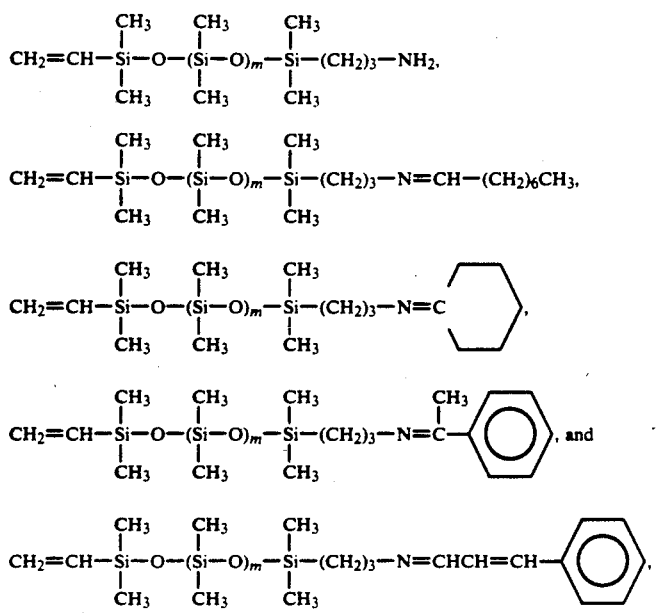

in the above 5 formulas, m is an integer of from 0 to 5. Typically, m is 0.

Polymerization conditions

If the amount of the organosilicon compound of (B) relative to the fluororubber of (A) is increased, the effects of the organosilicon compound are limited. Normally, the organosilicon compound of (B) is preferably used in an amount of from 1 to 100 parts by weight per 100 parts by weight of the fluororubber inasmuch as the graft copolymer obtained can give a rubber composition with other components, having good crosslink density after curing.

The graft copolymerization of the fluororubber of (A) and the organosilicon compound of (B) in the present process, can be normally carried out by first dissolving the fluororubber and the organosilicon compound in a solvent, and then heating the reaction mixture under stirring to allow reaction to proceed. The total concentration of the fluororubber and the organosilicon compound may be in a range from about 5 to 40% by weight. The solvent which may be used may be any of the solvents in which the organosilicon compound and the fluororubber can dissolve, including, e.g., ketones such as methyl ethyl ketone and methyl isobutyl ketone, fluorine-containing solvents such as m-xylene hexafluoride and p-xylene hexafluoride. Of these, the fluorine-containing solvents are preferred.

The polymerization may be performed by mixing reactants using kneaders, mixers such as a planetary mixer and a Shinagawa mixer, or a conventional glass container equipped with a stirrer, followed by heating. The heating may be also performed with the reactants being mixed. Where a glass container equipped with a stirrer is used, the reaction mixture is preferably subjected to polymerization as a solution in a concentration of 20% by weight or less because the stirring power is limited.

The polymerization temperature is preferably in a range from 100 to 300° C., more preferably from 150 to 250° C. inasmuch as a suitable reaction rate is attained. The polymerization time may be normally from about 5 to 90 minutes. Normally, when the polymerization is carried out at a temperature of from 150 to 250° C., the polymerization time may be from about 7 to 20 minutes.

It is preferable in the present process that the polymerization is carried out in the presence of an acid acceptor conventionally used in vulcanization of fluororubbers, since hydrogen fluoride that generates is neutralized, and therefore the polymerization proceeds smoothly. The acid acceptor which may be used includes, for example, metal oxides such as magnesium oxide and lead oxide, metal hydroxides such as calcium hydroxide, epoxy compounds, organic tin compounds, and alkali earth metal salts. Among these compounds, magnesium oxide is preferred because of its low activity. The acid acceptor is normally used in an amount of from about 0.1 to 50 parts by weight, preferably from 5 to 20 parts by weight, per 100 parts by weight of the fluororubber of (A).

In the graft copolymer obtained by the present process, a variety of additives may be optionally added as necessary, which include, for example, fillers such as carbon black, silica, clay, diatomaceous earth and talc, plasticizers such as fluororubbers with a relatively low molecular weight exemplified by DAI-EL G-101 (trade name, supplied by Daikin industries Co., Ltd.) and fluorine modified silicone fluids, various processing aids, lubricants such as aliphatic acids and metal salts thereof, e.g., stearic acid and metallic stearates, and other various additives conventionally added to fluororubbers. These additives may be added before or when the organosilicon compound of (B) is charged in or on a polymerization apparatus.

EXAMPLES

The present invention will now be described below with reference to working examples and comparative examples. In the following description, part(s) denotes part(s) by weight.

EXAMPLES 1-5, COMPARATIVE EXAMPLE 1

As given in Table 1, in each example, to 100 parts by weight of a fluororubber, a copolymer of vinylidene fluoride and hexafluoropropylene, DAI-EL 201 (tradename, supplied by Daikin industries, Co. Ltd.), 20 parts of an organosilicon compound of the formula (a), (b), (c), (d), (e) or (f) below, provided that m in the formulas are indicated for each example in Table 1, 20 parts of MT carbon black, and 15 parts of magnesium oxide were added successively, while kneading being carried out with a twin roll mill, and a mixture was thereby obtained.

copolymer was determined according to pre-determined calibration graph. The results are given in Table 1.

TABLE 1

|  | Example | | | | | | | | | Comparative Example |
|---|---|---|---|---|---|---|---|---|---|---|
|  | 1 | 2 | | 3 | 4 | | 5 | | | 1 |
| Fluororubber (parts) | 100 | 100 | 100 | 100 | 100 | 100 | 100 | 100 | 100 | 100 |
| MT carbon black (parts) | 20 | 20 | 20 | 20 | 20 | 20 | 20 | 20 | 20 | 20 |
| Magnesium oxide (parts) | 15 | 15 | 15 | 15 | 15 | 15 | 15 | 15 | 15 | 15 |
| Organosilicon compound | | | | | | | | | | |
| Amount (parts) | 4 | 4 | 4 | 4 | 4 | 4 | 4 | 4 | 4 | 4 |
| Kind | (a) | (b) | (b) | (b) | (c) | (d) | (e) | (e) | (e) | (f) |
| Number of m*[1] | 0 | 0 | 1 | 4 | 0 | 0 | 0 | 1 | 4 | 268 |
| Unreacted amount *[2] (parts) | 0 | 0 | 0 | 0 | 0 | 0 | 0 | 0 | 0 | 3.6 |

Remarks
*[1]Number of n in the formuras (a)–(f)
*[2]Amounts in parts by weight per 100 parts by weight of the fluororubber used.

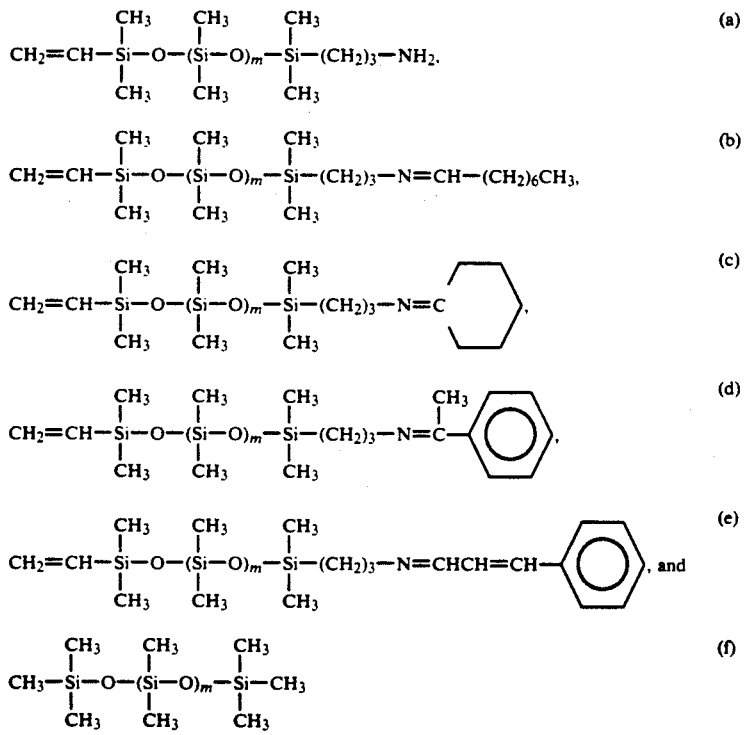

(Viscosity: 100 cSt at 25° C., trade name: KF-96, supplied by Shin-Etsu Chemical Co., Ltd.).

In each example, the mixture thus obtained was heated at 200° C. for 10 minutes to effect graft copolymerization, and a graft copolymer was thereby obtained.

Subsequently, to 20 parts of the graft copolymer obtained was added 80 parts of toluene, followed by stirring at 70° C. for 2 days, so that the organosilicon compound remaining in the graft copolymer was extracted with the toluene. The toluene solution obtained was analyzed by gas chromatography (Column: product by Gas Chro Kogyo, SE-30 10%, length: 3 m, column temperature: 70–300° C.). The amount of the unreacted organosilicon compound remaining in the graft

We claim:

1. A process for preparing and vulcanizing a fluororubber graft copolymer, comprising the step of graft-copolymerizing, onto (A) a polyamine-vulcanizable fluororubber, (B) at least one organosilicon compound having the general formula (I):

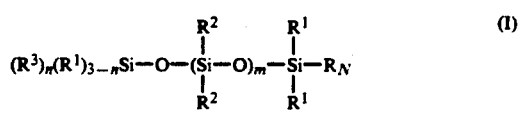

wherein plural $R^1$ and $R^2$ may be the same or different and each represent a substituted or unsubstituted monovalent organic group; $R^3$ represents a monovalent unsaturated aliphatic hydrocarbon group; and $R_N$ presents a nitrogen-containing organic group having the general formula (II);

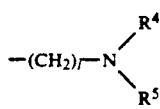  (II)

wherein R⁴ and R⁵ may be the same or different and each represent a hydrogen atom or a substituted or unsubstituted $C_1$-$C_{15}$ organic group, and l is an integer of from 1 to 6, or the general formula (III):

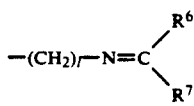  (III)

wherein R⁶ and R⁷ have the same meaning as R⁴ and R⁵ as defined above or may form together a divalent hydrocarbon group represented by the formula:

$$-(CH_2)_k-$$

where k represents an integer of from 4 to 9, and l is as defined above, n represents an integer of 1 to 3, and m is an integer of from 0 to 10; then vulcanizing said graft-copolymer with peroxide.

2. The process according to claim 1, wherein said fluororubber of (A) is a fluororubber comprising vinylidene fluoride.

3. The process according to claim 1, wherein said organosilicon compound of (B) is selected from the group consisting of the compounds represented by the formulas:

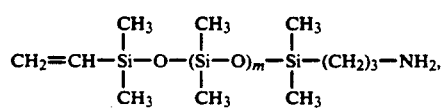

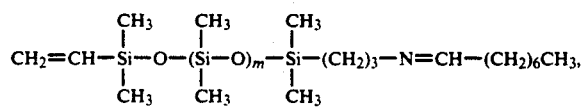

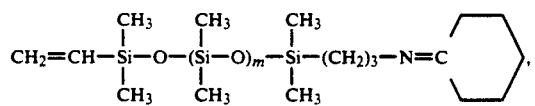

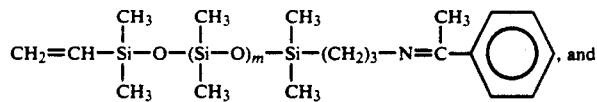, and

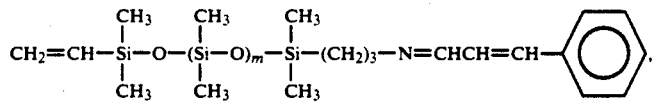

in the above 5 formulas, m is an integer of from 0 to 5.

* * * * *